Figures 1, 2:
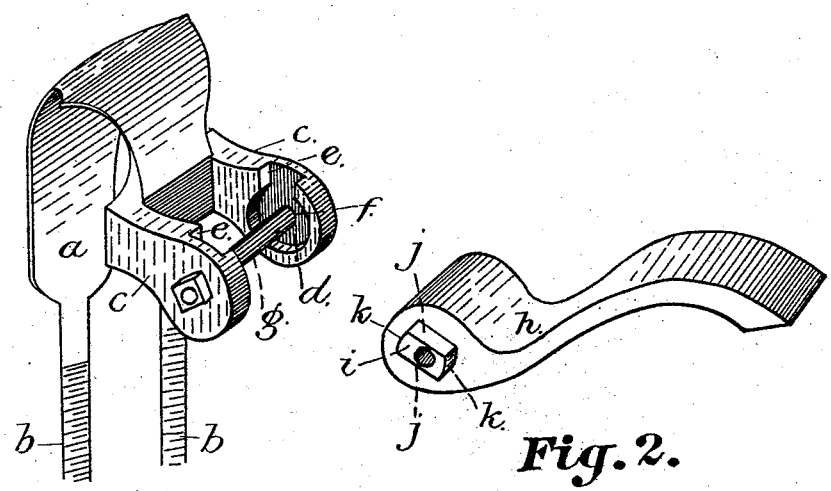

(No Model.)

N. A. SWETT.
THILL COUPLING.

No. 498,732. Patented May 30, 1893.

Witnesses:
F. J. Heley
E. B. Cummings

Inventor.
Nathaniel A. Swett,
by Elgin C. Verrill
attorney.

UNITED STATES PATENT OFFICE.

NATHANIEL A. SWETT, OF WESTBROOK, MAINE, ASSIGNOR TO HIMSELF AND HEBRON MAYHEW, OF SAME PLACE.

THILL-COUPLING.

SPECIFICATION forming part of Letters Patent No. 498,732, dated May 30, 1893.

Application filed December 30, 1892. Serial No. 456,755. (No model.)

*To all whom it may concern:*

Be it known that I, NATHANIEL A. SWETT, of Westbrook, in the county of Cumberland and State of Maine, have invented certain new and useful Improvements in Thill-Couplings; and I do hereby declare that the following is a full, clear, and exact description of the invention, which will enable others skilled in the art to which it appertains to make and use the same, reference being had to the accompanying drawings, and to letters of reference thereon, which form a part of this specification.

My invention relates to improvements in thill couplings.

It is designed to obviate danger of uncoupling and to prevent rattling.

It consists of the ordinary axle clip having parallel lugs integral therewith projecting forwardly one or both having on the inner side a circular recess and a groove leading thereinto and a coupling bar having projections on either side, said projections having parallel sides adapted to pass through said grooves into the recesses in said lugs.

In the drawings herewith accompanying and making a part of this application, Figure 1 is a perspective view of the axle clip and lugs and Fig. 2 is a perspective view of the coupling bar detached therefrom.

In said drawings *a* represents the clip adapted to pass around the axle and be rigidly secured thereto by nuts screwed to the bolts *b*. Integral with said clip are lugs *c* having on the inside circular recesses *d* and grooves *e* leading thereinto. In the center of the groove in the lugs are made holes *f* through which passes the coupling bolt *g*. The coupling bar *h* has on either side shoulders *i* having two parallel sides *j* sufficiently narrow to allow them to pass through the grooves into the recesses in the lugs. Said shoulders may be of the same diameter as said recesses if desired.

To insert the coupling bar in the lugs turn the bar until the parallel sides of the shoulders are parallel with the sides of the groove and pass the shoulders down through said groove and drop the bar. Then pass the coupling bolt through the lugs and through the coupling bar. The grooves may be in the top of the lugs as shown in Fig. 1, or in the bottom thereof. The advantage of having the grooves in the bottom is that sand and dirt would be less liable to get into the recess. The recess and groove may be omitted from one of the lugs without affecting the principle of my invention. If desired any convenient packing may be inserted in the recess. Arranged in this way there is no danger of the thills becoming detached from the carriage in as much as if the coupling bolt works out the shoulders will hold against the walls of the recess and prevent the thills from uncoupling; again when the diameter is the same as the diameter of the recess the shoulder working against the wall of the recess will prevent the wear of the bolt to a great extent and lessen very much the liability to rattle.

Having thus described my invention and its use, I claim—

1. In a thill coupling the combination with an axle clip provided with lugs having circular recesses on their inner sides and grooves of less diameter than the diameter of the coupling bars leading thereinto, of a coupling bar having shoulders on its sides adapted to be inserted through said grooves into said recesses, and a coupling bolt passing through said lugs and the coupling bar substantially as and for the purposes set forth.

2. In a thill coupling, the combination with an axle clip provided with lugs having circular recesses on the insides thereof and grooves leading thereinto, of a coupling bar having shoulders on the sides thereof, of equal diameter with said recesses but having two parallel sides adapted to be inserted through said grooves into said recesses and a coupling bolt passing through the sides of said lugs and the coupling bar, as and for the purposes set forth.

In testimony that I claim the foregoing as my own I affix my signature in presence of two witnesses.

NATHANIEL A. SWETT.

Witnesses:
ELGIN C. VERRILL,
NATHAN CLIFFORD.